US012627926B2

(12) United States Patent
Napoli et al.

(10) Patent No.: US 12,627,926 B2
(45) Date of Patent: May 12, 2026

(54) THERMAL PROTECTION FOR SYSTEM WITH DRIVER DRIVING MULTIPLE TRANSDUCERS

(71) Applicant: Cirrus Logic International Semiconductor Ltd., Edinburgh (GB)

(72) Inventors: Roberto Napoli, Cusano Milanino (IT); Philip B.J. Clarkin, Austin, TX (US); Zhengyi Xu, Fleet (GB); Chris Rattray, Newbury (GB); Edward Craney, Newbury (GB)

(73) Assignee: Cirrus Logic Inc., Austin, TX (US)

( * ) Notice: Subject to any disclaimer, the term of this patent is extended or adjusted under 35 U.S.C. 154(b) by 123 days.

(21) Appl. No.: 18/442,902

(22) Filed: Feb. 15, 2024

(65) Prior Publication Data

US 2025/0071493 A1     Feb. 27, 2025

Related U.S. Application Data

(60) Provisional application No. 63/520,973, filed on Aug. 22, 2023.

(51) Int. Cl.
*H04R 3/00*          (2006.01)
*H04R 29/00*          (2006.01)
(52) U.S. Cl.
CPC ........... *H04R 3/007* (2013.01); *H04R 29/001* (2013.01); *G01K 2217/00* (2013.01)
(58) Field of Classification Search
None
See application file for complete search history.

(56) References Cited

U.S. PATENT DOCUMENTS

| | | | |
|---|---|---|---|
| 9,942,676 B1 | 4/2018 | Jensen et al. | |
| 2017/0164127 A1* | 6/2017 | Gautama ................. | H04R 1/24 |
| 2020/0348249 A1 | 11/2020 | Marchais et al. | |
| 2023/0199384 A1 | 6/2023 | Roberto et al. | |
| 2024/0340582 A1* | 10/2024 | Jiang ........................ | H03F 3/20 |
| 2024/0340584 A1 | 10/2024 | Jiang et al. | |
| 2024/0422479 A1 | 12/2024 | Xu | |

OTHER PUBLICATIONS

Goertzel algorithm, Wikipedia, https://en.wikipedia.org/wiki/Goertzel_algorithm, downloaded Feb. 15, 2024.
International Search Report and Written Opinion, International Patent Application No. PCT/US2024/039620, mailed Nov. 12, 2024.

* cited by examiner

*Primary Examiner* — Antim G Shah
(74) *Attorney, Agent, or Firm* — Jackson Walker L.L.P.

(57)          ABSTRACT

An audio system may include a plurality of transducers, a temperature estimator, and a thermal control subsystem. The temperature estimator may be configured to monitor physical quantities associated with a plurality of transducers and based on the physical quantities, determine an estimated temperature associated with a first transducer of the plurality of transducers. The thermal control subsystem may be configured to generate an output signal based on an input signal, the output signal for driving the plurality of transducers and control the output signal based on the estimated temperature.

18 Claims, 6 Drawing Sheets

THERMAL PROTECTION FOR SYSTEM WITH DRIVER DRIVING MULTIPLE TRANSDUCERS

RELATED APPLICATION

The present disclosure claims priority to U.S. Provisional Patent Application Ser. No. 63/520,973, filed Aug. 22, 2023, which is incorporated by reference herein in its entirety.

FIELD OF DISCLOSURE

The present disclosure relates in general to estimating parameters of an electromagnetic load, for example, a haptic transducer.

BACKGROUND

Modern electronic devices, including smart phones, tablets, computers, and other devices, often include one or more transducers (e.g., one or more speakers and/or one or more haptic transducers) that may generate audio and/or haptic effects to a user of the devices.

Such transducers may be damaged when they are pushed to their limits. One common failure mode for over-driven transducers (e.g., speakers/haptics) is thermal damage. As an example, for speakers, if the voice coil exceeds a maximum temperature, the glues that hold the voice coil together and connect it to the diaphragm can melt and cause irreparable damage. As another example, at higher temperatures, magnets in a haptic transducer may become demagnetized and/or a coil of the haptic transducer may fuse, causing an electrical short. Speaker protection algorithms are commonly used to drive the speaker to its maximum volume while ensuring it does not exceed its rated limits, and similar protection algorithms may be used in connection with haptic transducers.

In conventional configurations, a single amplifier typically drives a single transducer. In order to determine thermal conditions of the transducer, a pilot tone, usually of low frequency (e.g., 12 Hz or 48 Hz) may be injected into the playback signal for the system. Often, such pilot tone is injected in the digital domain of the playback path, upstream of any digital-to-analog converter and amplifier in the playback path. A processing system may then monitor voltage and current signal feedback from the transducer (e.g., via analog-to-digital converters), and from such monitored voltage and current feedback, calculate resistance of a coil of the transducer. The calculated resistance Re may then be mapped directly to coil temperature through the following linear relationship:

$$T = \frac{\left(\frac{Re_{measured}}{Re_{cal}} - 1\right)}{\alpha} + T_{amb}$$

wherein T is the temperature of the coil, $\alpha$ is the temperature coefficient of the coil (e.g., nominally 0.00393 $\Omega/°$ C. for copper), $Re_{measured}$ is the calculated value of resistance, and $Re_{cal}$ is the calibrated value of resistance at an ambient temperature $T_{amb}$.

However, more modern transducer systems may include multiple transducers driven from a single amplifier. For example, a modern transducer system may include a single amplifier driving a dual audio transducer comprising a woofer (for playback of audio at lower audible frequencies)

and a tweeter (for playback of audio at higher audio frequencies) in parallel. By using conventional approaches of monitoring voltage and current delivered from the amplifier, the impedance measured using the single pair of feedback voltage and current signals is the parallel impedance of the two transducers (including any impedance of electrical components between the output of the amplifier and the transducers). However, existing approaches only enable measurement of this lumped parallel combination, but do not enable the determination of the individual coil resistances of the multiple transducers, and thus do not enable determination of individual coil temperatures of the multiple transducers.

SUMMARY

In accordance with the teachings of the present disclosure, the disadvantages and problems associated with thermal control of multiple transducers driven from a single amplifier may be reduced or eliminated.

In accordance with embodiments of the present disclosure, a method may include receiving an input signal, generate an output signal based on the input signal, the output signal for driving a plurality of transducers, monitor physical quantities associated with the plurality of transducers, determining an estimated temperature associated with a first transducer of the plurality of transducers based on the physical quantities, and control the output signal based on the estimated temperature.

In accordance with these and other embodiments of the present disclosure, a system may include a temperature estimator and a thermal control subsystem. The temperature estimator may be configured to monitor physical quantities associated with a plurality of transducers and based on the physical quantities, determine an estimated temperature associated with a first transducer of the plurality of transducers. The thermal control subsystem may be configured to generate an output signal based on an input signal, the output signal for driving the plurality of transducers and control the output signal based on the estimated temperature.

In accordance with these and other embodiments of the present disclosure, an audio system may include a plurality of transducers, a temperature estimator, and a thermal control subsystem. The temperature estimator may be configured to monitor physical quantities associated with a plurality of transducers and based on the physical quantities, determine an estimated temperature associated with a first transducer of the plurality of transducers. The thermal control subsystem may be configured to generate an output signal based on an input signal, the output signal for driving the plurality of transducers and control the output signal based on the estimated temperature.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figures 1, 2:
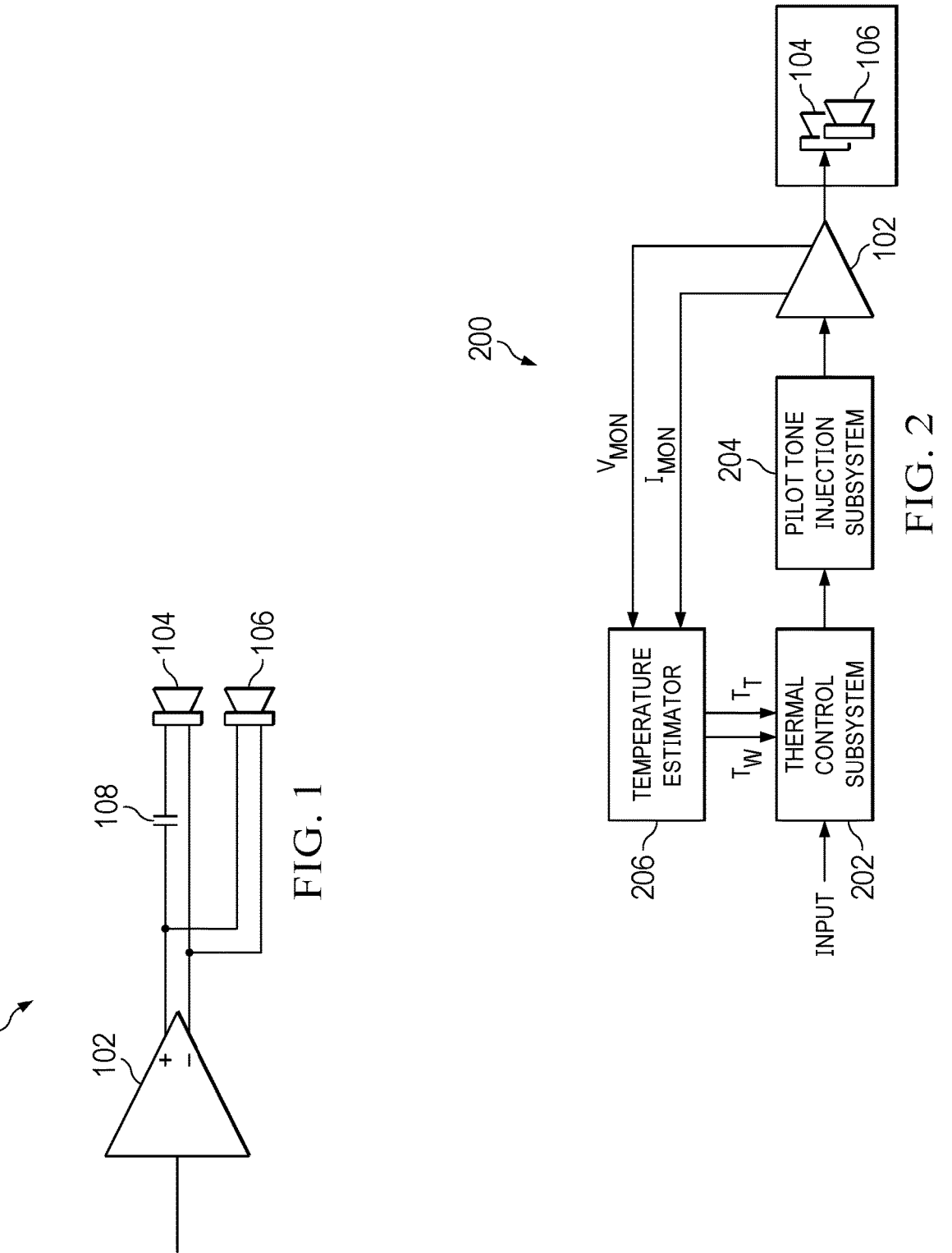
FIG. 1 illustrates selected components of an example system having multiple transducers driven by a single amplifier, in accordance with embodiments of the present disclosure.
FIG. 2 illustrates selected components of an example system having multiple transducers driven by a single amplifier and thermal protection for such multiple transducers, in accordance with embodiments of the present disclosure.

FIG. 1 illustrates selected components of an example system 100 having multiple transducers driven by a single amplifier, in accordance with embodiments of the present disclosure. In particular, system 100 depicts an amplifier 102 configured to drive two audio transducers, specifically a tweeter 104 and a woofer 106, wherein tweeter 104 and woofer 106 each has its own voice coil. Crossover filtering for the speakers may be achieved with a blocking capacitor 108, which together with resistance of tweeter 104 may form a first-order high-pass filter such that only higher-frequency audio above the cutoff frequency of such high-pass filter is received by tweeter 104. Because both tweeter 104 and woofer 106 are driven by amplifier 102 in parallel, impedance measured by a single pair of voltage and current feedback signals from the output of amplifier 102 may be used to calculate a parallel impedance $Z_p$ of woofer 106, tweeter 104, and blocking capacitor 108 combined, as given by:

$$Z_p = Z_w \left\| \left( \frac{1}{j\omega C} + Z_t \right) \right.$$

wherein $Z_w$ is the impedance of woofer 106, $Z_t$ is the impedance of tweeter 104, j is the imaginary number equal to the square root of $-1$, $\omega$ is an angular frequency associated with the signal driven by amplifier 102, and C is the capacitance of blocking capacitor 108.

For purposes of clarity and exposition, FIG. 1 depicts a simple first-order crossover filtering circuit. It is understood that other filtering circuits, including higher-order and/or more complex filtering circuits, may be used.

In some embodiments, tweeter 104 and woofer 106 may be packaged within a single dual-transducer module. Further, although FIG. 1 depicts only two transducers (namely tweeter 104 and woofer 106), in some embodiments system 100 may include any suitable number of three or more transducers.

FIG. 2 illustrates selected components of an example system 200 having multiple transducers driven by a single amplifier and thermal protection for such multiple transducers, in accordance with embodiments of the present disclosure. As shown in FIG. 2, system 200 may include a thermal control subsystem 202, a pilot tone injection subsystem 204, amplifier 102, a transducer module comprising tweeter 104 and woofer 106 (and blocking capacitor 108, although not shown in FIG. 2), and a temperature estimator 206.

Thermal control subsystem 202 may comprise any system, device, or apparatus configured to receive an input signal and modify the input audio signal in response to temperature information associated with tweeter 104 and woofer 106 (e.g., a temperature $T_T$ of the coil of tweeter 104 and a temperature $T_W$ of the coil of woofer 106), as described in greater detail below, in order to minimize thermal damage to tweeter 104 and woofer 106. For example, thermal control subsystem 202 may apply attenuation to particular frequency sub-bands of the input audio signal, attenuation to the full band of the input audio signal, and/or apply power limiting to the input audio signal to maintain temperatures of tweeter 104 and woofer 106 under critical levels in order to prevent or minimize damage to tweeter 104 and woofer 106.

Pilot tone injection subsystem 204 may comprise any system, device, or apparatus configured to inject one or more pilot tones of specific frequency or frequencies into the input audio signal for purposes of determining one or both of a resistance of the voice coil of tweeter 104 and a resistance of the voice coil of woofer 106, as described in greater detail below.

Amplifier 102 may receive the input audio signal, as modified by thermal control subsystem 202 and/or pilot tone injection subsystem 204, and drive an output signal to tweeter 104 and woofer 106 which is a function of the input signal. Although not shown in FIG. 2, some embodiments of system 200 may include a digital-to-analog converter interfaced between pilot tone injection subsystem 204 and amplifier 102 to convert the digital input signal into an equivalent analog signal. In other embodiments, amplifier 102 may include such digital-to-analog converter or may be otherwise configured to perform such conversion (e.g., a Class-D amplifier).

Temperature estimator 206 may comprise any system, device, or apparatus configured to monitor a voltage $v_{MON}$ across the parallel combination of tweeter 104 and woofer 106 and a current $i_{MON}$ delivered to the parallel combination of tweeter 104 and woofer 106, and based thereon, estimate one or both of a resistance of the coil of tweeter 104 and a resistance of the coil of woofer 106, and further from such estimated resistance(s), estimate temperature $T_T$ of the coil of tweeter 104 and temperature $T_W$ of the coil of woofer 106 and communicate such estimates to thermal control subsystem 202. As described in greater detail below, in some embodiments temperature estimator 206 may employ a feedforward approach to estimating temperatures $T_T$ and $T_W$, in which temperature estimator 206 utilizes pilot signal-based estimation of woofer temperature $T_W$ combined with a thermal model of the packaged module of tweeter 104 and woofer 106 to provide an estimate of tweeter temperature $T_T$. As also described below, in some embodiments, temperature estimator 206 may employ a feedback approach to estimating temperatures $T_T$ and $T_W$, using two pilot tone signals: a low-frequency pilot tone signal within the bass-band of woofer 106 and a high-frequency pilot towards the top end of the frequency response of tweeter 104. In such dual-pilot tone approach, temperature estimator 206 may also implement a parallel impedance solver to compute the separate resistances of tweeter 104 and woofer 106 from an estimate of the parallel impedance of tweeter 104 and woofer 106.

Figure 3:
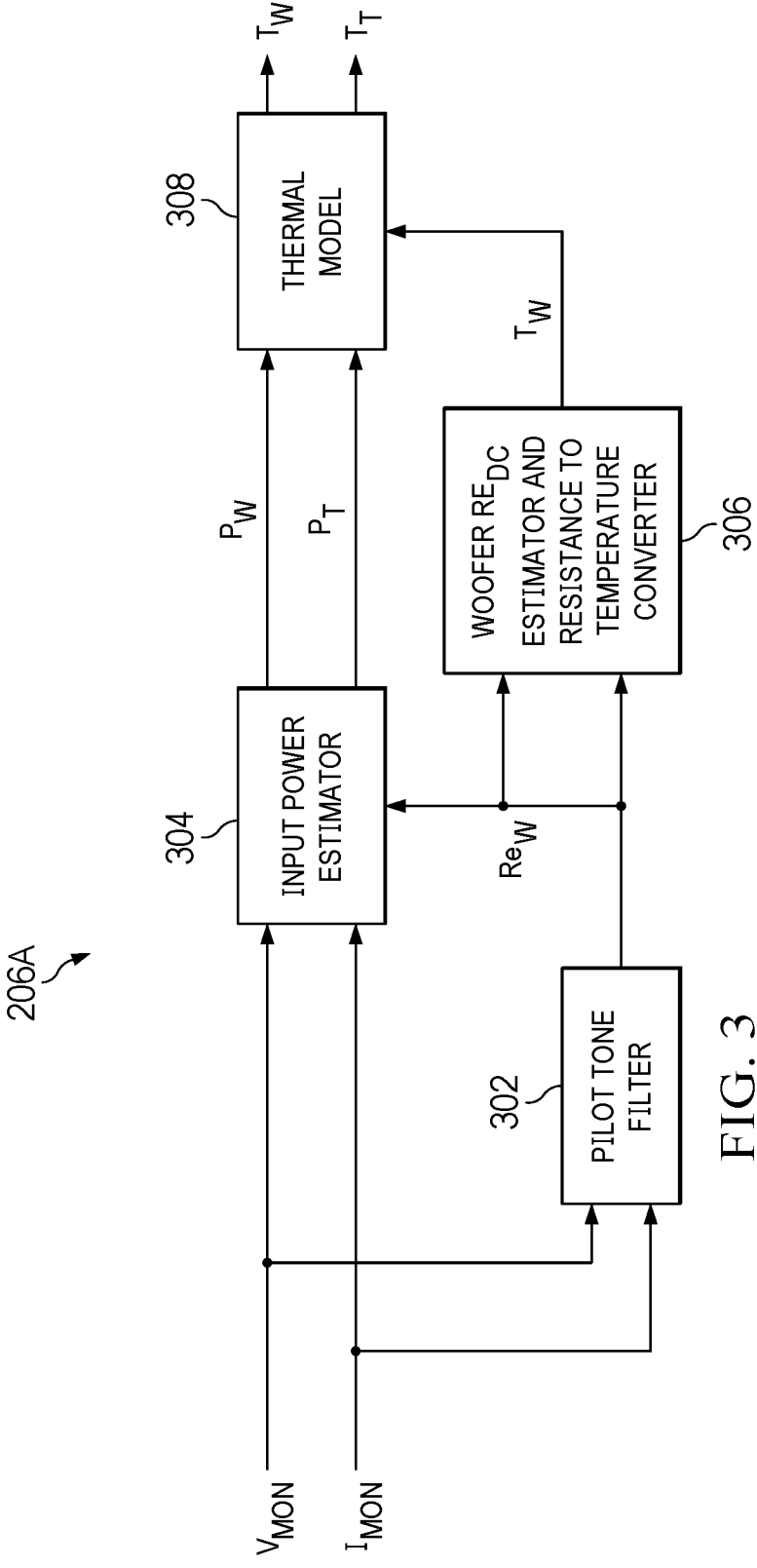
FIG. 3 illustrates selected components of an example temperature estimator using feed-forward temperature estimation with a thermal model, in accordance with embodiments of the present disclosure.

FIG. 3 illustrates selected components of an example temperature estimator 206A using feed-forward temperature estimation with a thermal model, in accordance with embodiments of the present disclosure. In some embodiments, temperature estimator 206A may be used to implement temperature estimator 206 depicted in FIG. 2. As shown in FIG. 3, temperature estimator 206A may include a pilot tone filter 302, input power estimator 304, woofer direct current (DC) resistance estimator and resistance-to-temperature converter 306, and thermal model 308.

A low-frequency pilot tone (e.g., at 12 Hz) may be applied by pilot tone injection subsystem 204, and pilot tone filter 302 may perform filtering to isolate the low-frequency components of monitored voltage $v_{MON}$ and current $i_{MON}$ responsive to the low-frequency pilot tone, and from such low-frequency components, estimate a resistance $Re_W$ of woofer 106. In parallel, input power estimator 304 may, based on monitored voltage $v_{MON}$ and current $i_{MON}$, and further based on resistance $Re_W$, estimate individual input powers $P_T$ and $P_W$ delivered by amplifier 102 to tweeter 104 and woofer 106, respectively, as described in greater detail below. In addition, woofer DC resistance estimator and resistance-to-temperature converter 306 may convert resistance $Re_W$ of woofer 106 to estimated temperature $T_W$, for example using the formula described in the Background section of this application, as well as estimating a direct current resistance $RE_{DC}$ for woofer 106. Thermal model 308 may receive temperature $T_W$ and input powers $P_T$ and $P_W$, and based thereon, generate final estimated temperatures $T_W$ for the coil of woofer 106 and $T_T$ for the coil of tweeter 104.

Figure 4:
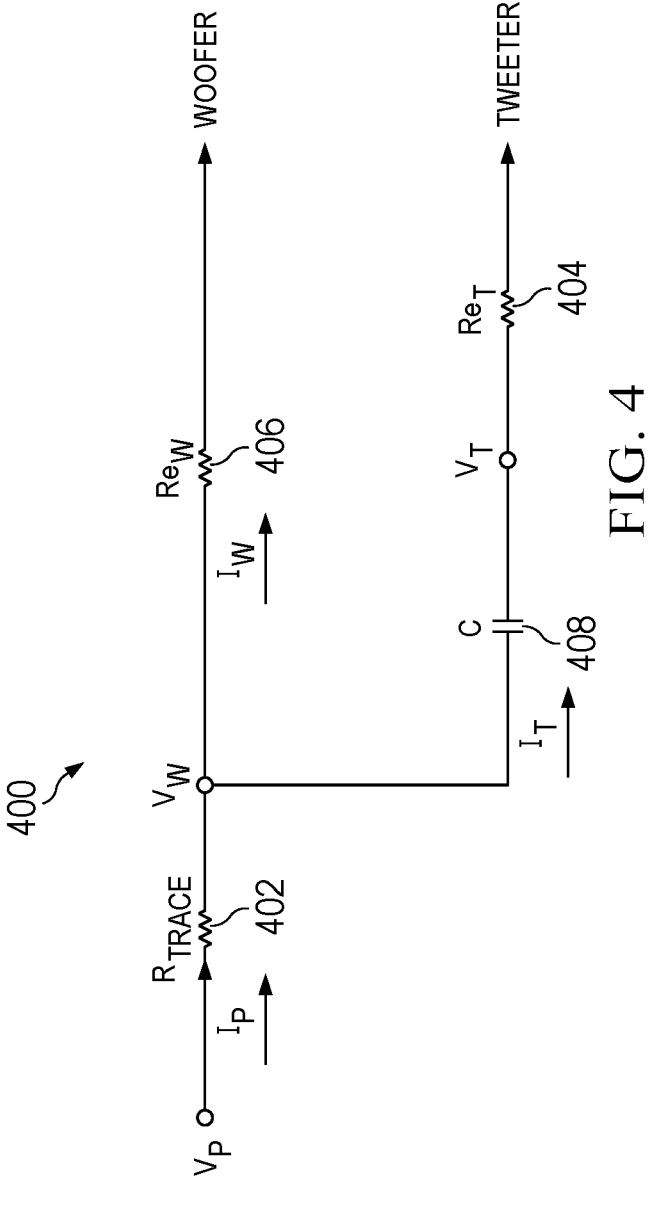
FIG. 4 illustrates a circuit model of an example parallel transducer circuit, in accordance with embodiments of the present disclosure.

FIG. 4 illustrates a circuit model 400 of an example parallel transducer circuit for tweeter 104 and woofer 106, in accordance with embodiments of the present disclosure. FIG. 4 may demonstrate the functionality of input power estimator 304. Circuit model 400 may be based on the circuit of example system 100 and include trace resistance present in such circuit. Voltage $V_P$ may represent monitored voltage $V_{MON}$, the voltage across the parallel combination of tweeter 104 and woofer 106 as seen by amplifier 102, and current $I_P$ may represent monitored current $I_{MON}$, the current through the parallel combination of tweeter 104 and woofer 106 as seen by amplifier 102. Circuit model 400 may include a trace resistance 402 having a resistance $R_{TRACE}$ representing a trace resistance between output terminals of amplifier 102 and the parallel combination of speakers. Circuit model 400 may further include a voltage $V_W$ representing an estimated voltage across the voice coil of woofer 106, a current $I_W$ representing an estimated current through the voice coil of woofer 106, and a resistance 406 having resistance $Re_W$ representing an estimated resistance of woofer 106. Circuit model 400 may also include a capacitor 408 having capacitance C representing a capacitance of blocking capacitor 108, a voltage $V_T$ representing an estimated voltage across the voice coil of tweeter 104, a current $I_T$ representing an estimated current through the voice coil of tweeter 104, and a resistance 404 having resistance $Re_T$ representing an estimated resistance of tweeter 104.

From circuit model 400, input power estimator 304 may calculate voltage $V_w$ across the voice coil of woofer 106 as:

$$V_W = V_P - I_P R_{TRACE}$$

Input power estimator 304 may then estimate woofer current $I_W$ using an admittance filter (e.g., which may be obtained a priori during characterization of woofer 106) which is the inverse of the impedance response of woofer 106:

$$I_W = ADM(V_W)$$

Input power estimator 304 may estimate woofer power as:

$$P_W = V_W I_W$$

Input power estimator 304 may estimate power dissipated by trace resistance 402 as:

$$P_{TRACE} = \frac{(V_P - V_W)}{R_{TRACE}}$$

and total power dissipated by the parallel combination of tweeter 104 and woofer 106 as:

$$P_{TOTAL} = V_P I_P$$

Input power estimator 304 may estimate the power of tweeter 104 and blocking capacitor 108 (e.g., capacitor 408) as $$P_{TC} = P_{TOTAL} - P_W - P_{TRACE}$$

From these estimates, input power estimator 304 may estimate tweeter current $I_T$ as:

$$I_T = \frac{P_{TC}}{V_W}$$

Input power estimator 304 may model capacitor 408 as a simple first-order high-pass filter and estimate tweeter voltage $V_T$ as the output of such high-pass filter:

$$V_T = HPF(V_W)$$

Input power estimator 304 may further use an equalization filter to compensate for over-estimation at higher frequencies (e.g., above 10 kHz). Such over-estimation may occur due to inaccuracies in the admittance filter and other residual errors in the estimation process. Such equalization may be tuned during thermal characterization of system 100 and/or system 200. Input power estimator 304 may estimate tweeter power as:

$$P_T = EQ(V_T) I_T$$

Input power estimator 304 may communicate these woofer and tweeter power estimates to thermal model 308.

Figure 5:
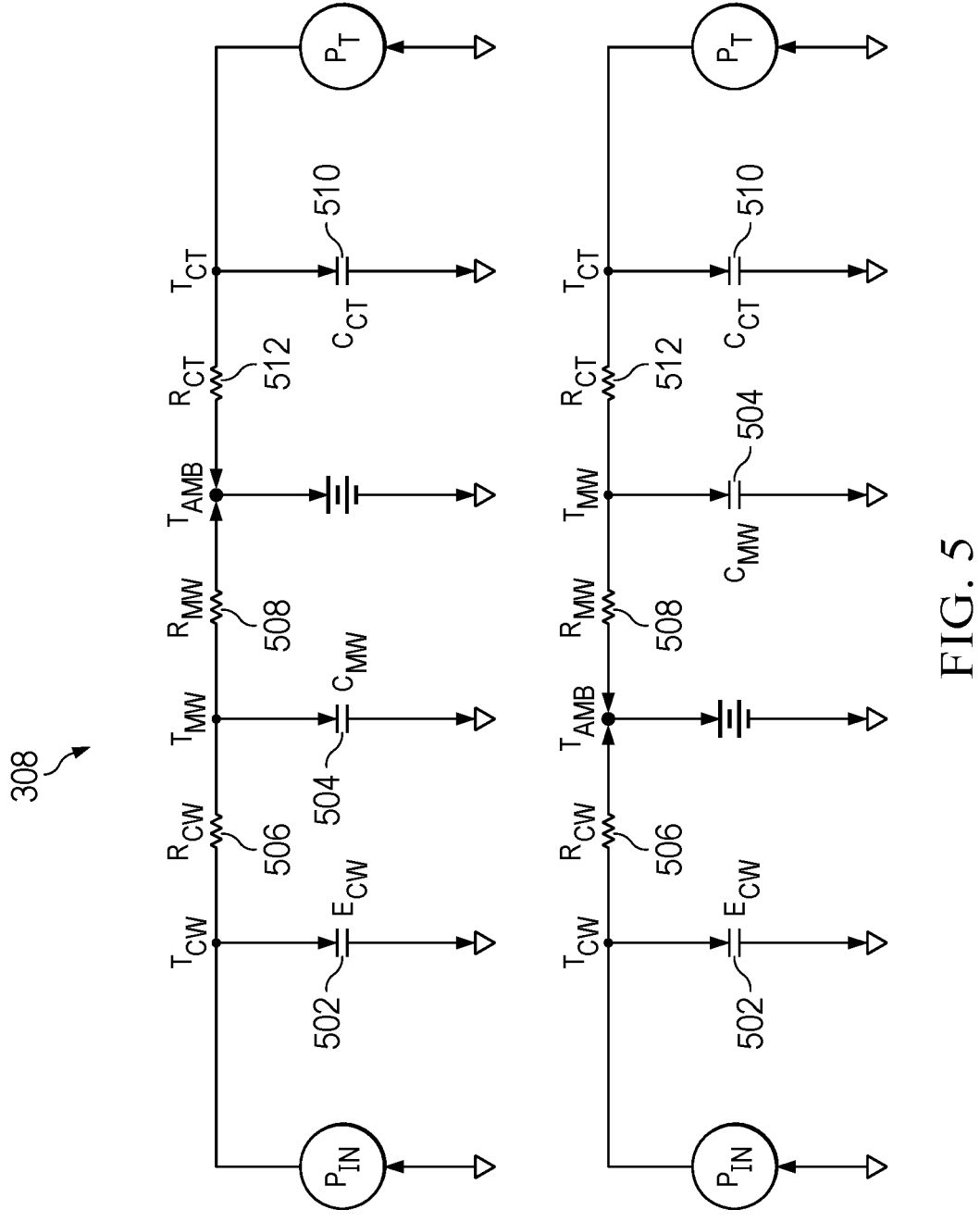
FIG. 5 illustrates an example thermal model, modeled as an electrical equivalent circuit model, of a package comprising a tweeter and woofer, in accordance with embodiments of the present disclosure.

FIG. 5 illustrates an example thermal model 308, modeled as an electrical equivalent circuit model, of a package comprising tweeter 104 and woofer 106, in accordance with embodiments of the present disclosure. In embodiments in which tweeter 104 and woofer 106 are integral to the same package, a degree of thermal coupling may exist between tweeter 104 and woofer 106 and to the air within the enclosure of such package. Thus, even if the input audio signal to amplifier 102 is limited to the band of woofer 106, tweeter 104 may experience heating due to such thermal coupling, and vice versa. In general, the voice coil of tweeter 104 may be significantly smaller than that of woofer 106 and thus may heat up significantly faster than woofer 106.

Thermal model 308 may assume that the capacitance of the magnet and voice coil of tweeter 104 may be lumped into a single capacitance for modelling. Such assumption may be accurate if thermal resistivity between the coil and the magnet is sufficiently small. Thus, thermal capacitance of tweeter 104 may be dominated by its magnet and not its coil.

As shown in FIG. 5, power $P_{IN}$ may represent input power to woofer 106 and $P_T$ may represent input power to tweeter 104. Capacitance 502 having capacitance $C_{CW}$ may represent the voice coil thermal capacitance of woofer 106, capacitance 504 having capacitance $C_{MW}$ may represent the magnet thermal capacitance of woofer 106, resistance 506 having resistance $R_{CW}$ may represent the voice coil thermal resistance of woofer 106, and resistance 508 having resistance $R_{MW}$ may represent the magnet thermal resistance of woofer 106. Capacitance 510 having capacitance $C_{CT}$ may represent the voice coil thermal capacitance of tweeter 104 and resistance 512 having resistance $R_{CT}$ may represent the voice coil thermal resistance of tweeter 104. Ambient temperature $T_{AMB}$ represents an ambient temperature inside the package.

Thermal coupling between tweeter 104 and woofer 106 may be modeled by resistances $R_{CW}$ and $R_{MW}$, which are thermal resistances to the ambient air inside the package.

Thermal model 308 may use the state-space form and define the following input vectors for the current state x(t) and the stimulus u(t). On each iteration, thermal model 308 may update to compute a new state and may be calculated as:

$$\begin{bmatrix} \dfrac{dT_{CW}}{dt} \\ \dfrac{dT_{CM}}{dt} \\ \dfrac{dT_T}{dt} \end{bmatrix} = [A] \begin{bmatrix} T_{CW} \\ T_{MW} \\ T_T \end{bmatrix} + [B] \begin{bmatrix} P_{IN} \\ T_{AMB} \\ P_T \end{bmatrix}$$

Pre-computer state space variables for matrix A may be given as:

$$[A] = \begin{bmatrix} \dfrac{-1}{C_{CW}R_{CW}} & \dfrac{1}{C_{CW}R_{CW}} & \beta \\ \dfrac{1}{C_{MW}R_{CW}} & \dfrac{-1}{C_{MW}}\left(\dfrac{1}{R_{CW}} + \dfrac{1}{R_{MW}}\right) & 0 \\ 0 & \dfrac{\alpha}{C_{CT}R_{CT}} & \dfrac{-1}{R_{CT}C_{CT}} \end{bmatrix}$$

The term $$\frac{\alpha}{C_{CT}R_{CT}}$$

may be used to link temperature of tweeter 104 with the magnet temperature of woofer 106 in order to model the thermal coupling from woofer 106 to tweeter 104. In practice, it may be useful to link temperature of tweeter 104 with temperature of woofer 106 with a tunable correction factor. Accordingly, thermal model 308 may apply tunable correction factor $\beta$ to link temperature of tweeter 104 with temperature of woofer 106. The constants $\alpha$ and $\beta$ may be obtained a priori during thermal characterization of system 100 and/or system 200.

Pre-computed space state variables for matrix B may be given as:

$$[B] = \begin{bmatrix} \dfrac{1}{C_{CW}} & 0 & 0 \\ 0 & \dfrac{1}{R_{MW}C_{MW}} & 0 \\ 0 & 0 & \dfrac{1}{C_{CT}} \end{bmatrix}$$

To illustrate the linking relationship, consider the initial states without temperature change of tweeter 104 and without change of power input:

$$C_{CT}\frac{dT_{CT}}{dt} = P_{IN} - \frac{T_{CT} - T_{MW}}{R_{CT}}$$

Further, suppose:

$$\frac{dT_{CT}}{dt} = 0$$

and $$P_{IN} = 0$$

Then:

$$T_{CT} = \alpha T_{MW}$$

In some embodiments, thermal capacitance and thermal resistance values may be obtained a priori through thermal characterization process. In other embodiments, thermal capacitance and thermal resistance values may be obtained a priori through thermal characterization process, and then iteratively tuned to improve overall accuracy of thermal model 308.

Figure 6:
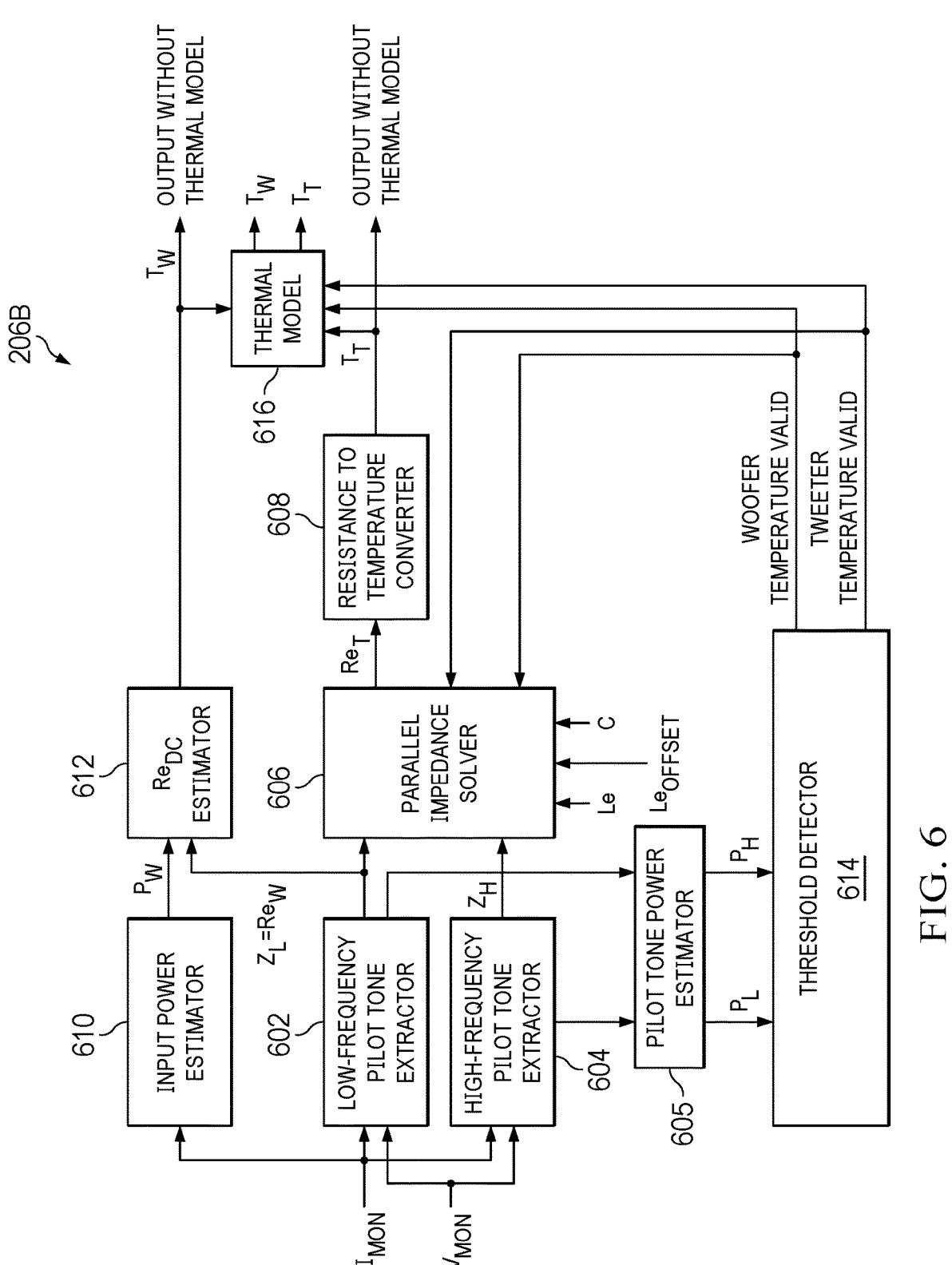
FIG. 6 illustrates selected components of an example temperature estimator using feedback temperature estimation, in accordance with embodiments of the present disclosure.

FIG. 6 illustrates selected components of an example temperature estimator 206B using feedback temperature estimation, in accordance with embodiments of the present disclosure. In some embodiments, temperature estimator 206B may be used to implement temperature estimator 206 depicted in FIG. 2. As shown in FIG. 6, temperature estimator 206B may include a low-frequency (e.g., 12 Hz) pilot tone extractor 602, a high-frequency (e.g., 20 kHz) pilot tone extractor 604, a parallel impedance solver 606, and a resistance-to-temperature converter 608.

A low-frequency pilot tone (e.g., at 12 Hz) may be applied by pilot tone injection subsystem 204, and low-frequency pilot tone extractor 602 may perform filtering to isolate the low-frequency components of monitored voltage $v_{MON}$ and current $i_{MON}$ responsive to the low-frequency pilot tone, and from such low-frequency components, estimate a resistance $Re_W$ of woofer 106.

In parallel, a high-frequency pilot tone (e.g., at 20 kHz) may be applied by pilot tone injection subsystem 204, and high-frequency pilot tone extractor 604 may perform filtering to isolate the high-frequency components of monitored voltage $v_{MON}$ and current $i_{MON}$ responsive to the high-frequency pilot tone, and from such high-frequency components, estimate an impedance $Z_H$ which may be the parallel combination of impedance $Z_W$ if woofer 106 is in parallel with an impedance $Z_T$ of the combination of tweeter 104 and blocking capacitor 108. In some embodiments, impedance $Z_H$ may be calculated from the high-frequency pilot tone using the Goertzel algorithm. For example, high-frequency pilot tone extractor 604 may apply the Goertzel filtering algorithm (e.g., at 20 kHz) separately to both monitored voltage $v_{MON}$ and monitored current $i_{MON}$, and overlap the samples in time such that when one Goertzel filter outputs a result, the other Goertzel filter may accumulate more samples. Such an approach may allow for operation with a larger accumulation window and reduce noise in the complex bin values.

Figures 7, 8:
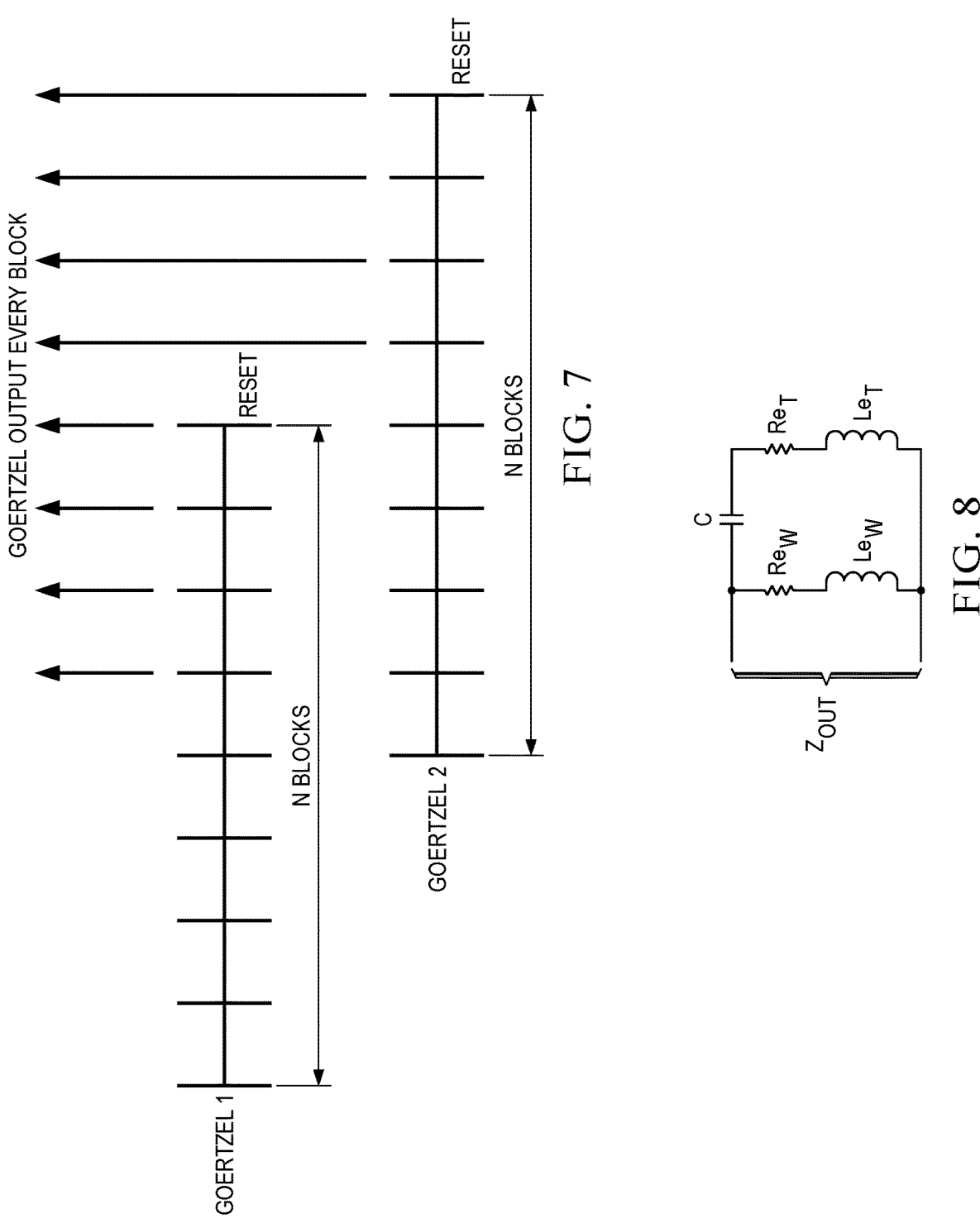
FIG. 7 illustrates example overlapped processing of two Goertzel filters, in accordance with embodiments of the present disclosure.
FIG. 8 illustrates an example passive circuit model for the output impedance as seen from an output of an amplifier, in accordance with embodiments of the present disclosure.

FIG. 7 illustrates example overlapped processing of two Goertzel filters, in accordance with embodiments of the present disclosure. For example, after accumulating over N blocks wherein N is a positive integer, a first Goertzel filter of high-frequency pilot tone extractor 604 may output a result. In parallel, a second Goertzel filter may accumulate samples but start an overset of N/2 blocks. When a Goertzel filter has accumulated a configured number of samples and the result is output, the Goertzel filter may be reset (e.g., filter accumulator set to zero) and the next value may be generated from the other Goertzel filter. Such process may continue alternating between the Goertzel filters.

Although Goertzel filtering with two parallel filters is disclosed herein, it is understood that more than two parallel filters may be used to apply Goertzel filtering. For example, in some embodiments, Goertzel filtering may be applied with four parallel filters with an overlap of 25%. Further, it is understood that filtering techniques (e.g., a standard fast Fourier transform) may be used in lieu of the Goertzel filtering described herein.

Parallel impedance solver 606 may use measured estimates of a resistance $Re_W$ and an impedance $Z_H$ (further described below) and other physical parameters of tweeter 104 and woofer 106 (e.g., capacitance C of blocking capacitor 108, inductances of tweeter 104 and woofer 106) to estimate an impedance $Z_T$ of tweeter 104. To illustrate functionality of parallel impedance solver 606, reference is made to FIG. 8, which illustrates an example passive circuit model for the output impedance $Z_{OUT}$ as seen from the output of amplifier 102, in accordance with embodiments of the present disclosure. As shown in FIG. 8, output impedance $Z_{OUT}$ may be modelled as the series combination of resistance $Re_W$ and inductance $Le_W$ of woofer 106 in parallel with the series combination of capacitance C of blocking capacitor 108 and resistance $Re_T$ and inductance $Le_T$ of tweeter 104.

Given the two pilot tones driven from amplifier 102, using the model shown in FIG. 8 results in a system of equations that may be solved to determine a resistance $Re_T$ of tweeter 104. At the frequency of the high-frequency pilot tone:

$$\frac{1}{Z_H} = \frac{1}{Re_T + \frac{1}{j\omega_H C} + j\omega_H Le_T} + \frac{1}{Re_W + j\omega_H Le_W}$$

At the frequency of the low-frequency pilot tone:

$$\frac{1}{Z_L} = \frac{1}{Re_T + \frac{1}{j\omega_L C} + j\omega_L Le_T} + \frac{1}{Re_W + j\omega_L Le_W}$$

Assuming that tweeter inductance $Le_T$ is sufficiently small, the terms $j\omega_H Le_T$ and $j\omega_L Le_T$ in the two foregoing equations may be ignored.

At the pilot tone frequencies, the complex terms of the two foregoing equations may be given as:

$$compT_L = \frac{1}{2\pi f_{pW} C}$$

$$compT_H = \frac{1}{2\pi f_{pT} C}$$

$$compW_L = 2\pi f_{pW} Le_W$$

$$compW_H = 2\pi f_{pT} Le_W$$

where $f_{pW}$ and $f_{pT}$ are the frequencies of the high-frequency and low-frequency pilot tones, respectively. The terms for inductance Le and capacitance C may be known a priori (e.g., through thermal characterization or nominal values in a datasheet for system 100).

Accordingly, the system of equations may be rewritten:

$$\frac{1}{Z_H} = \frac{1}{Re_T + compT_H} + \frac{1}{Re_W + compW_H}$$

$$\frac{1}{Z_L} = \frac{1}{Re_T + compT_L} + \frac{1}{Re_W + compW_L}$$

The two equations immediately above represent a system with two equations and two unknowns, namely resistances $Re_T$ and $Re_W$, which can be solved for resistances $Re_T$ and $Re_W$. Also, at the frequency of the low-frequency pilot tone, it may be assumed that $compW_L$ is negligibly small for small inductances $Le_W$, and at the frequency of the high-frequency pilot tone, it may be assumed that $compT_H$ is negligibly small for moderate capacitances C, then the two equations immediately above may be reduced to:

$$\frac{1}{Z_H} = \frac{1}{Re_T} + \frac{1}{Re_W + compW_H}$$

$$\frac{1}{Z_L} = \frac{1}{Re_T + compT_L} + \frac{1}{Re_W}$$

When solving for resistance $Re_T$, the term $Re_W + 2\pi f_{pT} Le$ may be critically important. In order to derive the correct value for resistance $Re_T$, it may be necessary to introduce a further term $Z_{WH}$Offset, resulting in $$Z_{WH} = Re_W + 2\pi f_{pT} Le + Z_{WH}\text{Offset}$$

Such offset may account for the fact that a speaker module may behave differently from the ideal circuit model of FIG. 8, and the impedance at high frequency of the woofer may be affected by unmodeled phase shifts. Further, the impedance Le used in the foregoing equations may deviate in value from that derived through typical Thiele-Small parameter characterization methods.

Using known algebraic techniques, parallel impedance solver 606 may solve for resistances $Re_T$ and $Re_W$.

Resistance-to-temperature converter 608 may convert resistance $Re_T$ of tweeter 104 to estimated temperature $T_T$, for example using the formula described in the Background section of this application. In some embodiments, resistance-to-temperature converter 608 may also convert resistance $Re_W$ of woofer 106 to estimated temperature $T_W$, for example using the formula described in the Background section of this application.

Further, in parallel with the previously-described components of temperature estimator 206B, temperature estimator 206B may include an input power estimator 610 configured to estimate (e.g., based on the square of current $i_{MON}$) the input power $P_W$ to woofer 106. A DC resistance estimator 612 may, based on such input power $P_W$ and the estimate of woofer resistance $Re_W$ estimated by low-frequency pilot tone extractor 602, generate an estimate of woofer temperature $T_W$, which may be used in lieu of or in addition to the estimate of woofer temperature $T_W$ provided by thermal model 616.

In some cases, a pilot signal with a sufficiently high enough voltage level (e.g., greater than 0.2 V) may be undesirable if it becomes audibly noticeable to the listener or if the pilot tone itself causes additional unwanted heating of the voice coil of tweeter 104. In such cases, as an alternative to using the high-frequency pilot tone, temperature estimator 206B may include a threshold detector 614 that may, based on estimates of power of the extracted pilot tone signals $P_L$ and $P_H$ determined by a pilot tone power estimator 605, determine if enough signal content is present in monitored voltage $v_{MON}$ and current $i_{MON}$ at high frequency in order for the Goertzel filters of high-frequency pilot tone extractor 604 to generate an estimated impedance $Z_H$ for input to parallel impedance solver 606. If enough signal content is present, then tweeter impedance $Z_T$ may be computed by parallel impedance solver 606, and parallel impedance solver 606 may extract the real portion of tweeter impedance $Z_T$ to estimate tweeter resistance $Re_T$, thus enabling resistance to temperature converter 608 to convert tweeter resistance $Re_T$ to tweeter temperature $T_T$. However, if the signal content is insufficient, thermal model 616 (which may be similar or identical in structure and/or function to thermal model 308) may be used to estimate temperature $T_T$.

As described above, thermal control subsystem 202 may modify the input audio signal in response to estimated temperature $T_T$ and/or estimated temperature $T_W$, in order to minimize thermal damage to tweeter 104 and woofer 106. For example, thermal control subsystem 202 may apply attenuation to particular frequency sub-bands of the input audio signal, attenuation to the full band of the input audio signal, and/or apply power limiting to the input audio signal to maintain temperatures of tweeter 104 and woofer 106 under critical levels in order to prevent or minimize damage to tweeter 104 and woofer 106.

In some embodiments, thermal control subsystem 202 may apply a full-band thermal limiter to control temperatures of both of tweeter 104 and woofer 106. In such embodiments, thermal control subsystem 202 may be based on thermal control based on the maximum of estimated temperature $T_T$ and estimated temperature $T_W$, which is then used by thermal control subsystem 202 to attenuate the full-band of the input signal as the temperature rises. Further, in some of such embodiments, thermal control subsystem 202 may apply a thermal rate limiter in order to control sudden increases in temperature of tweeter 104 as a result of energy in higher frequency bands (e.g., vocals), which may present problems when estimated temperature $T_T$ and/or estimated temperature $T_W$ are already high.

Because thermal characteristics (e.g., thermal resistance and thermal capacitance) of tweeter 104 and woofer 106 may be different, they may effectively have different thermal time constants. Accordingly, tweeter 104 and woofer 106 may heat up and cool down at different rates. For example, due to its smaller size, tweeter 104 may change in temperature more rapidly than woofer 106. Thus, one potential improvement to the full-band thermal limiting approach described above is to utilize two stages of limiting (e.g., arranged in cascade), with different attack and decay tuning parameters for the two stages. A faster limiter attack rate may be used for tweeter 104, with a slower limiter attack rate for woofer 106.

In these and other embodiments, in addition to or in lieu of full-band limiting, thermal control subsystem 202 may employ multi-band limiting. For example, thermal control subsystem 202 may employ crossover filtering to split the input signal into a high-frequency band and a low-frequency band (e.g., with the crossover split approximately equal to the frequency of crossover between tweeter 104 and woofer 106). Thermal control subsystem 202 may then limit the high-frequency band based on estimated temperature $T_T$, limit the low-frequency band based on estimated temperature $T_W$, and then combine the two resulting thermally controlled subband signals, thus allowing for independent control of temperatures of tweeter 104 and woofer 106.

In some embodiments, thermal control subsystem 202 may perform multi-band limiting using selective acoustic optimization and a multi-band dynamic range compressor in a manner similar to that described in U.S. patent application Ser. No. 17/735,419 filed May 3, 2022, and U.S. patent application Ser. No. 18/334,795 filed Jun. 14, 2023, both of which are incorporated by reference herein in their entireties.

In these and other embodiments, thermal control subsystem 202 may perform root-mean-square (RMS) limiting in which thermal control subsystem 202 splits the input signal into a high-frequency band and a low-frequency band (e.g., with the crossover split approximately equal to the frequency of crossover between tweeter 104 and woofer 106) and limit the RMS voltage level in the high-frequency band to a set threshold that decreases as estimated temperature $T_W$ increases, before recombining the two frequency bands into a single signal. Estimated temperature $T_T$ may not be used in such approach.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising:
receiving an input signal;
generating an output signal based on the input signal, the output signal for driving a plurality of transducers;
monitoring physical quantities associated with the plurality of transducers;
based on the physical quantities, determining an estimated temperature associated with a first transducer of the plurality of transducers;
determining based on the physical quantities a first estimated power delivered to the first transducer and a second estimated power delivered to a second transducer of the plurality of transducers; and
determining a second estimated temperature of the second transducer from a thermal model of the plurality of transducers based on the estimated temperature, the first estimated power, and the second estimated power; and
controlling the output signal based on the estimated temperatures.

2. The method of claim 1, wherein the physical quantities comprise a voltage applied to the plurality of transducers and a current delivered to the plurality of transducers.

3. The method of claim 1, wherein the plurality of transducers comprises a woofer for playback of low-frequency content and a tweeter for playback of high-frequency content higher in frequency than the low-frequency content.

4. The method of claim 3, wherein the tweeter and the woofer are integral to a single integrated speaker module.

5. The method of claim 1, further comprising:
driving a first pilot tone on the output signal at a first frequency;
extracting a response of the physical quantities responsive to the first pilot tone; and
determining the estimated temperature based on the response.

6. The method of claim 5, further comprising:
driving a second pilot tone on the output signal at a second frequency;
extracting a second response of the physical quantities responsive to the second pilot tone; and
determining the estimated temperature and the second estimated temperature of the second transducer of the plurality of transducers based on the response and the second response.

7. A system comprising:
a temperature estimator configured to:
monitor physical quantities associated with a plurality of transducers;
based on the physical quantities, determine an estimated temperature associated with a first transducer of the plurality of transducers;
determine based on the physical quantities a first estimated power delivered to the first transducer and a second estimated power delivered to a second transducer of the plurality of transducers; and
determine a second estimated temperature of the second transducer from a thermal model of the plurality of transducers based on the estimated temperature, the first estimated power, and the second estimated power; and
a thermal control subsystem configured to:
generate an output signal based on an input signal, the output signal for driving the plurality of transducers; and
control the output signal based on the estimated temperatures.

8. The system of claim 7, wherein the physical quantities comprise a voltage applied to the plurality of transducers and a current delivered to the plurality of transducers.

9. The system of claim 7, wherein the plurality of transducers comprises a woofer for playback of low-frequency content and a tweeter for playback of high-frequency content higher in frequency than the low-frequency content.

10. The system of claim 9, wherein the tweeter and the woofer are integral to a single integrated speaker module.

11. The system of claim 7, further comprising a pilot tone injection subsystem configured to drive a first pilot tone on the output signal at a first frequency, and wherein the temperature estimator is further configured to:
extract a response of the physical quantities responsive to the first pilot tone; and
determine the estimated temperature based on the response.

12. The system of claim 11, wherein:
the pilot tone injection subsystem is configured to drive a second pilot tone on the output signal at a second frequency; and
the temperature estimator is further configured to:
extract a second response of the physical quantities responsive to the second pilot tone; and determine the estimated temperature and the second estimated temperature of the second transducer of the plurality of transducers based on the response and the second response.

13. An audio system comprising:
a plurality of transducers;
a temperature estimator configured to:
monitor physical quantities associated with the plurality of transducers; and
based on the physical quantities, determine an estimated temperature associated with a first transducer of the plurality of transducers;
determine based on the physical quantities a first estimated power delivered to the first transducer and a second estimated power delivered to a second transducer of the plurality of transducers; and
determine a second estimated temperature of the second transducer from a thermal model of the plurality of transducers based on the estimated temperature, the first estimated power, and the second estimated power; and
a thermal control subsystem configured to:
generate an output signal based on an input signal, the output signal for driving the plurality of transducers; and
control the output signal based on the estimated temperatures.

14. The audio system of claim 13, wherein the physical quantities comprise a voltage applied to the plurality of transducers and a current delivered to the plurality of transducers.

15. The audio system of claim 13, wherein the plurality of transducers comprises a woofer for playback of low-frequency content and a tweeter for playback of high-frequency content higher in frequency than the low-frequency content.

16. The audio system of claim 15, wherein the tweeter and the woofer are integral to a single integrated speaker module.

17. The audio system of claim 13, further comprising a pilot tone injection subsystem configured to drive a first pilot tone on the output signal at a first frequency, and wherein the temperature estimator is further configured to:
extract a response of the physical quantities responsive to the first pilot tone; and
determine the estimated temperature based on the response.

18. The audio system of claim 17, wherein:
the pilot tone injection subsystem is configured to drive a second pilot tone on the output signal at a second frequency; and
the temperature estimator is further configured to:
extract a second response of the physical quantities responsive to the second pilot tone; and
determine the estimated temperature and the second estimated temperature of the second transducer of the plurality of transducers based on the response and the second response.

* * * * *